United States Patent [19]

Cosentino et al.

[11] Patent Number: 5,795,649
[45] Date of Patent: Aug. 18, 1998

[54] RELEASE FILM AND METHOD OF MAKING THEREOF

[75] Inventors: Steven R. Cosentino, Quinton, Va.; David Edward Higgins, Whitby, England

[73] Assignee: ICI Americas Inc., Wilmington, Del.

[21] Appl. No.: 656,739

[22] Filed: Jun. 3, 1996

[51] Int. Cl.$^6$ .......................... B32B 15/08; B32B 27/36; B05D 3/02

[52] U.S. Cl. .......................... 428/336; 427/383.1; 427/384; 427/385.5; 427/393.5; 427/404; 427/412.1; 427/412.5; 428/412; 428/458; 428/461; 428/462; 428/463; 428/475.8; 428/476.3; 428/483; 428/516; 428/517; 428/520

[58] Field of Search .......................... 428/336, 412, 428/475.8, 476.3, 483, 516, 517, 520, 458, 461, 462, 463; 427/383.1, 384, 385.5, 393.5, 404, 412.1, 412.5

[56] References Cited

U.S. PATENT DOCUMENTS

| | | | |
|---|---|---|---|
| 3,962,397 | 6/1976 | Narui et al. | 264/144 |
| 4,623,462 | 11/1986 | Urig et al. | 210/508 |
| 4,981,915 | 1/1991 | MacLeay et al. | 525/327.6 |
| 5,037,693 | 8/1991 | Hart | 428/323 |
| 5,055,343 | 10/1991 | Muphy | 428/209 |
| 5,110,670 | 5/1992 | Janocha et al. | 428/216 |
| 5,135,812 | 8/1992 | Phillips et al. | 428/403 |
| 5,180,788 | 1/1993 | Vroomans | 525/285 |
| 5,190,609 | 3/1993 | Lin et al. | 156/85 |
| 5,383,995 | 1/1995 | Phillips et al. | 156/230 |
| 5,419,936 | 5/1995 | Tindale | 428/35.8 |
| 5,491,023 | 2/1996 | Tsai et al. | 428/349 |
| 5,500,302 | 3/1996 | Phillips et al. | 428/474.4 |

FOREIGN PATENT DOCUMENTS

| | | |
|---|---|---|
| 0 360 385 | 3/1990 | European Pat. Off. . |
| 1540067 | 2/1979 | United Kingdom . |

OTHER PUBLICATIONS

Database WPI Section Ch, Week 9226, Derwent Publications Ltd., London, GB; Class A18; AN 92–212096 XP002042305 & JP 04 139 259 A (Toshiba Silicone KK), 13 May 1992 see Abstract.

Patent Abstracts of Japan vol. 018, No. 559 (M–1692), 25 Oct. 1994 & JP 06 199060 A (Dainchiseika Color & Chem. Mfg. Co. Ltd), 19 Jul. 1994, see Abstract.

Patent Abstracts of Japan vol. 016, No. 413 (C–0980), 2 Sep. 1992 & JP 04 139288 A (Nitto Denko Corp), 13 May 1992, see Abstract.

Database WPI Section Ch, Week 7808, Derwent Publications Ltd., London, GB; Class A18; AN 78–14509A XP002042306 & JP 50 146 631 A (Showa Electric Wire Co., Ltd), 25 Nov. 1975, see Abstract.

Database WPI Section Ch, Week 9511 Derwent Publications Ltd., London, GB; Class A18; AN 95–078205 XP002042307 & JP 07 003 192 A (Sunstar Giken KK), 6 Jan. 1995, see Abstract.

*Primary Examiner*—D. S. Nakarani
*Attorney, Agent, or Firm*—John F. Daniels, III

[57] ABSTRACT

A release film which is a polymeric film coated with a release resin which is a water soluble copolymer containing styrene is disclosed. The release film is especially suitable for receiving a layer(s) of metal for release of the metal flakes. The released metal flakes possess enhanced optical properties.

26 Claims, No Drawings

RELEASE FILM AND METHOD OF MAKING THEREOF

FIELD OF THE INVENTION

The present invention is directed to a polymeric film coated with an aqueous based release layer of resin. More particularly, the invention is directed to a polymeric film coated with a low molecular weight styrene copolymer.

Background of the Invention

A polymeric film coated with a release layer of resin and then vapor deposited with a layer(s) of metal has been utilized for the purpose of producing flat and highly reflective and/or colored metal flakes with certain desirable optical properties. Typically, several layers of metal vapor are deposited on the coated film. The metal coated film is generally immersed in a solvent bath to release the metal flakes. The flakes are then collected and processed into a pigment with high specular performance. A release coating on the film is required, or otherwise the deposited metal adheres to and cannot be removed from the film.

The coated film products currently used for this purpose are off-line coated by a converter and not in-line coated by a film manufacturer. These converter coated products also utilize cellulosic and other resins in organic solvents. These solvents are expensive and require solvent incinerators and recovery systems to meet stringent pollution standards for disposal.

With regard to aqueous (water-soluble) resins, most commercially available water-based acrylic and other water-based emulsions are not suitable as a release coating for metal flakes. Use of such resins may result in several problems, such as:

a) poor adhesion of the release coating and/or metal flakes to the coated film causing dusting-off of the flakes prior to solvent stripping;

b) the flakes cannot be removed because of poor coating solubility in solvent;

c) the flakes do not lay flat due to poor thermal stability of the coating and pigments with inferior optical properties result;

d) the size of the metal flakes is not optimum;

e) the flakes (pigment) will not disperse well in the ink resin, paint or polymer and product of a poor quality results; and f) the resins may contain noxious volatile components that cause fuming and unacceptable odor levels in the film manufacturing plant.

Some commercially available acrylic and other resins, when coated on polymeric films, will dissolve in solvent and produce acceptable pigment. However, these resins are not without limitations and difficulties. For one, these resins have poor film forming properties and are difficult to coat and draw in the film process without cracking. They, therefore, require the addition of plasticizers and coalescing aids (which are generally organic chemicals). These resins also tend to be dissolved in organic solvents that have the disadvantages discussed above and, therefore, cannot be coated in-line safely and economically.

Also, commercially available aqueous low molecular weight acrylic resins tend to have poor heat resistance. The resulting flakes are not flat and, accordingly, possess poor optical properties.

There, therefore, remains an unfulfilled need in the art for a polymeric film coated with a release layer, or coating, of an aqueous based resin having an improved adhesion of the coating to the film, which coated film advantageously provides improved release for layer(s) of metal deposited thereon, thus producing a flat metal flake with improved optical properties (high reflectance) than has heretofore been accomplished. There also remains a need for providing such a release film which can be economically manufactured, and which utilizes more environmentally friendly solvents than have been previously utilized.

SUMMARY OF THE INVENTION

The above-described needs are advantageously and unexpectedly met by way of the present invention, which provides a release film which is a polymeric film coated on at least one surface thereof with a release layer of a resin, which is an aqueous composition of a low molecular weight styrene copolymer. The styrene copolymer is preferably a low molecular weight styrene/maleic anhydride or styrene/acrylic polymer or blends thereof. The release film is defined as a film which is strippable in the presence of an appropriate solvent.

Another aspect of the present invention is a method of making a release film which comprises the steps of:

(a) coating the film on at least one surface thereof with a release layer, the release layer being an aqueous composition of a low molecular weight styrene copolymer;

(b) heating said coated film at a temperature sufficient for drying the composition to the film; and (c) heat setting the dried film.

The method of the present invention surprisingly and unexpectedly provides a release film having a release layer which is better anchored to the film and results in less flaking of the release resin from the film.

The release film coated with an aqueous based (water-soluble) resin of the present invention is particularly and unexpectedly suitable as a substrate for receiving a layer(s) of metal vapor deposited thereon, which metal can be released from the film by immersion in an appropriate solvent. The flat metal flakes can then be collected and processed into a highly reflective/colored pigment. The metal flakes surprisingly adhere well to the release film of the present invention with less dusting off of the flakes prior to solvent stripping. Also because of the enhanced thermal stability of the release film, the released metal flakes are flat and of an optimum size and shape, and disperse well in subsequent processes.

The metal flakes released from the coated film of the present invention therefore surprisingly and unexpectedly possess optical properties equal to or better than has heretofore been accomplished, and are especially suitable as a highly reflective/colored pigment for high quality inks. The metal pigments are also suitable for incorporation into paints, polymers, resins, and coatings.

The release film of the present invention can also advantageously be economically manufactured, which manufacture also favorably utilizes environmentally friendly solvents.

These and other features, aspects and advantages of the present invention will become better understood with reference to the following description and appended claims.

DETAILED DESCRIPTION OF THE INVENTION

As indicated above, the present invention provides a release film, which is a polymeric film coated with an aqueous composition of a release resin which is a low molecular weight styrene polymer such as styrene/maleic anhydride or styrene/acrylic polymer or blends thereof. The invention further provides a method of making the coated film. Each of these are described separately below.

Polymeric Film

Any thermoplastic film is suitable for practice of the present invention. Non-limiting examples include polyester, polypropylene, polyethylene, polybutene, olefin copolymers, polyamide, polycarbonate and polyacrylonitrile.

Preferably the films of the present invention are based on crystallizable polyester resulting from the polycondensation of a glycol or diol such as ethylene or propylene glycol or butane diol, and mixtures thereof, with terephthalic acid or dimethyl terephthalate, and other dicarboxylic acids such as naphthalene dicarboxylic acid, isophthalic acid, diphenic acid or sebacic acid, or mixtures of terephthalic acid and naphthalene dicarboxylic acid, isophthalic acid, diphenic acid, sebacic acid, or their polyester forming equivalents, as known in the art, or mixtures of dimethyl terephthalate and naphthalene dicarboxylic acid, isophthalic acid, diphenic acid and sebacic acid, or their polyester forming equivalents. Polyester film useful in the present invention includes polyethylene terephthalate (PET), polyethylene napthalate (PEN), polypropylene terephthalate, and polybutylene terephthalate, or mixtures of these, or copolyester films in which any one of the above mentioned polyesters is present. For example, a copolyester film of polyethylene terephthalate and isophthalate (PETIP) is well known in the art and is within the scope of the present invention. Also, within the scope of the present invention is a copolyester film of PET and PEN. A typical polyester film, for the purpose of the present invention, is PET.

Although the present invention is typically directed to oriented polymeric films, a general description of polyester film will be employed to illustrate known conventional processes. In this process, polyester resin is melted and extruded as an amorphous sheet onto a polished revolving casting drum to form a cast sheet of the polymer. Thereafter, the film is heated to just above its glass transition temperature, from about 80° C. to 100° C., and is generally stretched or drawn in one or more directions. For example, the film may be stretched or drawn in the direction of extrusion (longitudinal direction), or perpendicular to the direction of extrusion (transverse direction), or both directions in which case biaxially oriented film is produced. The first stretching, which imparts strength and toughness to the film, conventionally ranges from about 2.0 to about 4.0 times its original length. In the practice of the present invention, as discussed in more detail further below, the film is coated with the aqueous composition of the release resin utilized, prior to a second stretching, e.g., in the transverse direction, and heat setting of the film. The second stretching, as well as any subsequent stretchings, can also range from about 2.0 to 4.0 times the original size of the film. The film is then heat set at a temperature range generally between 190° C. to 240° C. to "lock in" the strength, toughness and other physical properties of the film.

The thickness of the polymeric film considered suitable for the present invention is generally less than about 250 microns, typically less than 175 microns, preferably about 50 microns or less, e.g., in the range of about 12 to 25 microns.

Release Resin

The aqueous based release resin utilized in the present invention in the compositions for coating the above-described film and forming a coated film with the advantageous and unexpected properties of the present invention is a low molecular weight, water soluble styrene-based copolymer. By low molecular weight is meant from about 700 to about 10,000 (weight average). Styrene copolymer is defined as a copolymer of one or more monomers of styrene and one or more monomers of an alpha, beta-unsaturated carboxylic acid or cyclic dicarboxylic acid anhydride. More particularly, the styrene copolymer is a low molecular weight styrene/maleic anhydride or styrene/acrylic polymer or blends thereof.

The styrene-maleic anhydride copolymers suitable for use in this invention are a general class of compounds comprised of the alternating units of styrene and maleic anhydride, or the non-equimolar copolymers containing less than about 50 mole percent of the anhydride monomer. The styrene may be replaced in whole or in part by other vinylaromatic monomers including substituted styrenes such as alpha-methylstyrene, nuclear methylstyrenes, ethylstyrene, isopropylstyrene, t-butylstyrene, chlorostyrene, dichlorostyrene, bromostyrene, and dibromostyrene. Similarly, the maleic anhydride can be replaced in whole or in part by another alpha, beta-unsaturated cyclic dicarboxylic acid anhydride, such as itaconic, aconitic, citraconic, mesaconic, chloromaleic, bromomaleic, dichloromaleic, dibromomaleic, phenylmaleic and the like. The preferred alpha, beta-unsaturated cyclic dicarboxylic acid anhydride is maleic anhydride. The polymer may also contain a termonomer such as 1–3 carbons alkyl acrylate or methacrylate, acrylonitrile, methacrylonitrile, acrylamide, methacrylamide, acrylic acid or methacrylic acid.

Suitable copolymers may be prepared by any of the several methods available for the preparation of styrene-maleic anhydride copolymers or they may be purchased commercially. Non-equimolar polymers may be prepared by solution polymerization directly from the respective monomers by the incremental addition of the reactive monomer as taught by U.S. Pat. No. 2,971,939, by a continuous recycle polymerization process described in U.S. Pat. No. 3,509,110 (which patents are incorporated herein by reference), or by numerous known variations.

Suitable styrene maleic anhydride polymers include the unmodified 1000, 2000 and 3000 series of resins which are commercially available from Elf Atochem as SMA® polymers. Particularly suitable for use in the present invention are the partially esterified, low molecular weight (MW 700–2500) styrene/maleic anhydride polymers designated SMA® resins in aqueous ammonia. Hydrolyzed resins particularly found suitable include SMA® 1440H, 2625H and 17352H. SMA® 1400H and 17352H resins are the partial esters of the base resin SMA® 1000, while 2625H is the partial ester of the base resin SMA® 2000. SMA® 1440H is particularly preferred because it is softer, and can be used as a release coating in the compositions utilized in the present invention without requiring any further additives. It can also be interdraw coated with standard coating equipment and methods, and can be drawn in the film orientation process without cracking. The other SMA® resins described are also suitable, but are more brittle and more difficult to coat the film without the addition of plasticizers and other additives. Blends of the various SMA® resins are also suitable, e.g., a blend of SMA® 1440H and 2625H. For example, a uniform blend of 20 parts of SMA® 2625H and 80 parts of SMA® 1440H is suitable. The SMA® resins can be purchased in hydrolyzed form for ease of dilution in water, or in solid form which needs to be hydrolyzed before use as a release coating.

The following is illustrative of the suitable embodiments of SMA® resin for use in the present invention.

Commercially available styrene maleic anhydride polymer such as SMA® 1440 is obtained as a dry resin. This resin is hydrolyzed before use. The SMA® 1440 resin (15 weight parts) is weighed and added to water (100 weight parts) while maintaining vigorous agitation until the resin is well dispersed. The water-resin slurry is heated to the reaction temperature of 62°–68° C. while agitating. Ammonium hydroxide (28% concentration) is slowly added at the rate of 23 parts ammonium hydroxide to 100 weight parts SMA® 1440 resin. The mixture is agitated while the reaction temperature is maintained for one hour. The solution is then cooled to room temperature before use. (See Elf Atochem publication "Solubilizing SMA Resins in Water", which is incorporated herein by reference). The cooled solution is then diluted with water at the ratio of about 1 part SMA® 1440 hydrolyzed solution to 1 part water. The result is a 7% solids aqueous solution ready for coating on the polymeric film.

More preferably, SMA® 1440H resin (the ammonium salt of SMA 1440), which is a commercially available 30% solids ammoniacal solution of SMA® 1440 resin in water, is used for ease of preparation for coating. Alternatively, SMA® 1440 HLS resin, a commercially available 18% solids ammoniacal solution of SMA® 1440 resin in water, also provides for simple handling of the aqueous coating composition. The method for preparing the coating solution from the hydrolyzed resins is as follows: SMA® 1440H resin (30 weight parts) or SMA® 1440 HLS resin (65 weight parts) is added to a tank with 100 parts of water and agitated until the resin is completely dissolved. The resulting respective 7% resin solids solutions are ready for coating polymeric film utilized in the present invention.

The SMA® resins employed in the present invention can, if desired, be substituted, e.g., undergo sulfonation, esterification and imidization with various amines by well-known techniques in the art.

While not wishing to be limited by any particular theory, it is considered that when an SMA® resin, for instance 1440H, is coated and heat set on polyester film (e.g. MELINEX® film), the resin may be chemically altered so as to act like a coating with a much higher glass transition temperature than has been reported (Tg of 44° C.). Hence, the heat set resin is unexpectedly more thermally stable and has better adhesion to the polymeric film than one would expect for an aqueous based release coating. Also, the solubility of the SMA® resin in solvent is improved. This, therefore, results in the release film of the present invention with the above-identified surprising properties.

Another example of a suitable aqueous release resin for use in the present invention is a low molecular weight styrene/acrylic copolymer. The suitable styrene/acrylic copolymers have a weight average molecular weight from about 3,000 to about 10,000. Particularly suitable for use are the low molecular weight styrene/acrylic copolymers designated CARBOSET® resins, which are commercially available from the BF Goodrich Company. Suitable CARBOSET® copolymers include GA-1160, GA-1161, GA-1162, GA-1250, GA-1166, XPD-2299 and GA-1926. GA-1931 and GA-1161 are particularly suitable and can be used alone as a release resin. GA-1160, GA-1166, GA-1162, GA-1926 and GA-1250 are more suitable as blending resins to impart improved heat resistance to the release coating.

Styrene acrylic copolymers can be prepared for use in coating solutions utilized in the present invention as follows:

Carboset® GA-1161 is a low molecular weight styrene/acrylic copolymer commercially available in dry pellet form. A 7% resin solids solution ready for coating on polymeric film is prepared by dissolving 7.5 weight parts of Carboset® GA-1161 resin in 100 weight parts of ammonia water and stirring for one hour.

More preferably, Carboset® GA-1931 can be used for ease of preparation of the coating solution. Carboset® GA-1931 resin is of the same chemical composition as Carboset® GA-1161 resin, but is commercially available as a 41% solids solution in ammonia water. The coating solution is prepared by dissolving Carboset® GA-1931 (21 weight parts) in 100 weight parts of water to produce a 7% solids solution ready for coating on polymeric film.

Blends of styrene maleic anhydride resins and styrene acrylic resins are also within the scope of the present invention. For example, a 40/60 blend of SMA® 2625H and Carboset® GA 1931 is particularly suitable for improving the heat resistance of the release layer coated on the polymeric film. See Table 2. Other blends of these resins can be readily made and utilized without the exercise of undue experimentation.

If desired, other additives may be included with the aqueous-based release resins used in the present invention to provide for an even distribution of the resin coatings on the film. These include plasticizers, surfactants, defoamers and coalescing agents which are well-known to one of skill in the art of film coatings. Anti-static and slip agents can also be incorporated in the coating or coated on the other surface. A thermosetting acrylic, as described in U.S. Pat. No. 4,571,363 (incorporated herein by reference) can also be applied to the non-coated surface of the film. It should be particularly noted to avoid the use of cross-linking agents in the release compositions utilized in coating the film, which agents will interfere with the release of metal pigments from the release film. The coating layer of release resin is thus non-crosslinked to the polymeric film.

Method of Making the Release Film

Another aspect of the present invention is a method of making the release film of the present invention which comprises the steps of:

(a) coating the film on at least one surface thereof with a release layer, the release layer being an aqueous composition of a low molecular weight styrene copolymer;

(b) heating said coated film at a temperature sufficient for drying the composition to the film; and (c) heat setting the dried film.

With respect to the coating of the film, the aqueous composition employed in the present invention can be applied to the polymeric film by any conventional method. Such methods include spray coating, roll coating, reverse roll coating, air knife coating, rod coating, slot coating, meniscus coating, immersion coating and gravure coating. An offset gravure coater utilizing a chrome or ceramic gravure roll and a rubber applicator roll is also considered suitable. Reverse roll gravure coating is preferred, which method is simpler and provides a good quality coating. This coating method utilizes a chrome or ceramic engraved roll with a metal or plastic doctoring system.

The coating is typically applied to the film as an aqueous solution at a solids concentration of about 0.5 to about 15% by weight, preferably from about 5 to about 10%, more preferably from about 6 to about 8% by weight. A solids concentration of greater than 15% results in an increase in the viscosity of the coating solution. High solids concentrations (>15%) and high viscosity (>about 100 cP) increase the difficulty in applying the coating solution to the film, increase coating defects, and negatively impact the coating uniformity of the release film. High solids concentrations also increase the need for the addition of plasticizers and coalescing aids into the coating formula to enable a clear, continuous release coating to be produced. These plasticizers and coalescing aids are typically organic chemicals that are best avoided for safety and environmental reasons.

Conversely, as the coating solution is reduced below about 7%, the release of metal flakes becomes increasingly difficult, since there is insufficient release resin present to absorb the solvent.

The wet coating thickness of the aqueous compositions typically range from about 3 to about 9 microns, preferably from about 5 to about 7 microns.

In-line coating of the film (where the coating is applied during the film manufacturing process) is the preferred manner of coating the film. The film can also be coated post-draw but this is not preferred. If desired, the film can also be coated off-line (on another coating machine), however, also with less than optimal results and at a greater expense. Also by coating film in-line, the aqueous compositions can be advantageously utilized with no noxious odors in the film manufacturing plant or need for special air emission control equipment.

Typically, the film is heated and then stretched or drawn in the direction of extrusion (longitudinal), typically in a draw ratio of 3.0:1 to 4.0:1. The stretched film is then cooled by contact with chilled rolls at a temperature from about 15° to 25° C. to reduce crystallization and embrittling of the film. The uniaxially stretched film is then passed through an inter-draw coater, where the aqueous-based release resin composition can be applied as described above to either or both sides of the film. The coater speed is typically +/−30% of the film line speed.

The coated film then enters a tenter frame, wherein the film is preheated and the coating is dried at a temperature of from about 95° to about 110° C., drawn in the traverse direction by a ratio of 3.0:1 to 4.5:1 at a temperature of from about 110° to about 130° C., and then heat set for a time from about 1 to about 60 seconds, typically about 2 to about 15 seconds.

With respect to heat setting the coated film, the temperature generally can range from about 190° to about 240° C., preferably about 225° to about 237° C.; especially about 230° to about 235° C.

The dry coating thickness of the resin on the film typically ranges from about 0.01 to about 0.2 microns, preferably from about 0.05 to about 0.18 microns; especially about 0.12 microns.

Metallization of the Release Film

The release or strippable film of the present invention is particularly suitable as a substrate for receiving a layer(s) of metal vapor deposited thereon and for stripping said metal from said film under appropriate solvent conditions.

Metallization of the coated polymeric film of the present invention can be accomplished by any of the conventional methods used in the production of metallized films. These conventional methods include vapor and vacuum deposition. Typical metals contemplated include aluminum, chromium, magnesium, copper, nickel, zinc, tin, silver, gold, titanium, silicon, bismuth, or any compound containing the foregoing metals or combination thereof These compounds include oxides, nitrides, fluorides, and carbides. Aluminum is most typically employed. The metal layer(s) can be of a thickness which ranges from about 0.005 to about 50 microns, particularly from about 0.1 to about 5 microns, and more particularly from about 0.25 to about 2 microns.

The metallized release film can then be immersed or exposed to a solvent, such as acetone or methylethylketone, as is well-known in the art to release the metal in the form of flakes. The solvent penetrates through cracks in the metal layer into the release resin coating, which solvent then swells and dissolves the resin coating and releases the metal flakes. The metal flakes can then be readily collected and processed into a highly reflective pigment for inks or paint coatings applications. The metal flakes can be collected and processed to the desired size as described in U.S. Pat. No. 5,135,812, which is incorporated herein by reference.

Although not preferred, alkali solutions can also be employed to dissolve the release coating and release metal flakes.

Partial removal of the coating may be useful in other applications such as packaging. For example, the film of the present invention can be metallized as described above, and an area of the film printed with a solvent or alkali resistant ink. The film can then be washed with an appropriate solvent or an alkali solution that removes the metal from the unprinted area, while leaving the metal under the ink.

Additional applications include the removal of metallized structures such as holograms. The removed materials are then suitable as pigments or fillers in paints. The coated film of the present invention is also suitable in applications involving general purpose ink adhesion coating and adhesion primer treatment for laminating polyester, such as PET or PEN, to other films.

Advantages

The present invention surprisingly and unexpectedly provides a release film, which is a polymeric film with an aqueous release resin layer coating, said resin layer having an improved anchorage to and less flaking off from the polymeric film. The release film has enhanced thermal stability and solvent solubility. The release film of the present invention accordingly provides an especially suitable substrate for deposition of metal thereon and a superior release medium for the metal. The released flat metal flakes possess excellent optical and dispersing properties, which are especially suitable for various ink and paint applications.

The release film of the present invention is also more economical to produce and utilizes aqueous resins which are more environmentally friendly than the organic solvent based resin solutions typically utilized.

The coated films of the present invention exhibit excellent heat stability, and accordingly, any scrap coated film made during the production can be mixed with fresh polymer (for example, polyester polymer), remelted, and re-extruded to produce an oriented film for coating by way of the present invention. Such films could contain up to about 70% by weight of coated scrap reclaim, particularly in applications where color and appearance of the substrate are not critical. In those applications where color and appearance are important, the amount of reclaim employed can be up to an amount where perceptible degradation of the color properties (due to the presence of the coating impurities) is not easily or readily detected. The coated films of the present invention offer an advantage over other commercially available release films which may tend to degrade and discolor when reclaim is employed for use in the polymeric film.

The following Examples are provided for purposes of illustrating the present invention and should not be construed in any manner whatsoever as limiting the scope thereof In the Examples, the following materials and procedures were employed, except where specifically described otherwise in the Examples.

Polyester resin (PET) was dried and extruded into a flat sheet and cooled on a chilled roll or drum. The temperature of the cast film was then increased by passing the film over hot rollers (80°–85° C.) and heating by infrared heaters. The film was then stretched lengthwise at a draw ratio of 3.4:1. The stretched film was contacted with chilled rolls (15°–25° C.), which reduced the film temperature to minimize crystallization and embrittling of the film. (All the above is standard for making 2 mil or 200 gauge (50 micron) finished thickness PET film).

The film was then passed through an inter-draw coater where the coating solution at a concentration of 7% solids was applied to one side of the film by a reverse roll direct coater. The 7% coating solution was prepared by mixing the appropriate amount of resin in 100 parts of water, with no crosslinking agents and kept clean from residuals of other coatings. The coater speed was 250 fpm (feet per minute) and the linespeed was 220 fpm.

The coated film was then dried in a tenter frame in two forced air ovens at 105° C. The film was then drawn in the transverse direction at a ratio of 3.0:1 to 4.5:1 in two ovens operating at 110°–130° C. After drawing, the coated film was heat set for 8 seconds in three heat-setting ovens operating at between 225° to 237° C. The dry coating thicknesses are described in Table 2. The film was then cooled in an air oven operating at 165° C.

The resins used in the examples are described in Table 1 below.

Table 2 shows a number of release resins tested in release films (see Table 1 for a description of the resins, wherein SMA® 1440H, 2625H, 17352H, Carboset® XPD 2299 and Carboset® GA-1931 resins, as well as blends thereof, are exemplary of the present invention), and graded on a scale of 1 to 10 (1 being poor and 10 being excellent) for coating uniformity of the resin on the film, solvent removability of the release resin from the film, coating adhesion of the coated film, and the optical properties of the metal flakes released from the coated polymeric film. These parameters and how they were measured are described hereinafter.

a. Coating Uniformity

Why measured: Some coatings may have good acetone removability but lack adequate coating quality for a metal vapor deposition process where variable flake properties could result in areas of the coated film where there are coating defects. Flake stripping from the film may not be uniform where there are coating defects and thickness variations.

Method of Measurement: The coated film was visually inspected for uniform coating appearance and graded on a scale of 1 (no coating defects seen) to 10 (severe coating disturbance). The presence of coating streaks and voids indicated uneven coating thickness.

b. Solvent (acetone) Removability

Why measured: The coating composition must dissolve in solvent so that the metal flake can be removed from the film. Poor solvent solubility results in high manufacturing cost due to flake loss—the flake will not wash off as a result and will be disposed of with the film.

Method of Measurement: A strip of the coated film was partially dipped into a container of solvent and allowed to soak for a fixed time of 4 seconds. The sample was then removed from the solvent, allowed to air dry, and the residual coating on the film was visually graded according to the following scale:

1—complete removal of the coating by the solvent

10—coating unaffected by solvent c. Pigment Optical Property

Why measured: Good pigment (flake) optical property is an essential requirement that describes the appearance of the final product (flake). Method of Measurement: After depositing the metal vapor on the coated film, a microscope was used to examine the appearance of the metal coating on the film. The metal coating appeared as flakes under 200X magnification and was visually graded as follows:

1

Flat flakes with narrow gaps between flakes.
The metal coated film appeared bright.
Flake size was uniform.

10

The flakes were curved up at the edges with wide gaps between flakes.
The metal coated film appeared dull and hazy.
Flake size was random.

d. Adhesion of Release Coating

Why Measured: Coatings which can be pulled off with tape are more prone to rubbing-off in the manufacturing process. Coatings having better adhesion can handle more abuse and cause less debris.

Method of Measurement: A piece of adhesive tape such as Scotch® Brand 610 Tape (3M) was applied to the coated surface and removed. The coated film was visually examined to assess if the release coating was pulled off the film surface. The film was graded as follows:

1—No coating removed from film surface

10—Coating was completely removed from film surface

EXAMPLES 1–12

Table 2 describes the results obtained with PET film coated with examples of copolymers utilized in the present invention.

TABLE 1

| Resin | Description | Manufacturer | Tg(C) | Molecular Weight |
|---|---|---|---|---|
| Carboset ®GA 1931 | Styrene/acrylic copolymer (solution) | B. F. Goodrich | 70 | 3,000 |
| Carboset ®XPD 2299 | Styrene/acrylic copolymer (solution) | B. F. Goodrich | 70 | 10,000 |
| Carboset ®GA 1166 | Styrene/acrylic copolymer (solution) | B. F. Goodrich | 120 | 6,500 |
| SMA ®1440H | Partially esterified styrene maleic anhydride polymer (solution) | Elf Atochem N.A. | 44 | 2,200 |

TABLE 1-continued

| Resin | Description | Manufacturer | Tg(C) | Molecular Weight |
|---|---|---|---|---|
| SMA ®2625H | Partially esterified styrene maleic anhydride polymer (solution) | Elf Atochem N.A. | 110 | 2,200 |
| SMA ®17352H | Partially esterified styrene maleic anhydride polymer (solution) | Elf Atochem N.A. | 124 | 2,200 |

Tg - Measured by Differential Scanning Calorimeter (DSC)
Molecular Weight - Measured by Gel Permeation Chromatograph (GPC)

TABLE 2

| Resin | Release Layer Thickness (microns) | Heat setting Temp (C.) | Coating Uniformity | Solvent Removability | Coating Adhesion | Optical Property | Acceptable |
|---|---|---|---|---|---|---|---|
| SMA 1440H | 0.1 | 230 | 1 | 1 | 1 | 1 | yes |
|  | 0.2 | 230 | 2 | 1 | 1 | 1 | yes |
| SMA 2625H | 0.09 | 220 | 1 | 1 | 1 | 1 | yes |
| SMA 17352H | 0.09 | 220 | 1 | 1 | 1 | 1 | yes |
| SMA 1440H/2625H* | 0.1 | 232 | 1 | 1 | 1 | 1 | yes |
| SMA 2625H/Carboset GA 1931** | 0.18 | 230 | 1 | 1 | 1 | 1 | yes |
| Carboset GA 1931 | 0.09 | 220 | 1 | 2 | 1 | 1 | yes |
|  | 0.18 | 232 | 1 | 2 | 1 | 1 | yes |
| Carboset XPD 2299 | 0.05 | 220 | 1 | 1 | 1 | 1 | yes |
|  | 0.15 | 220 | 2 | 1 | 1 | 1 | yes |
| Carboset GA 1166/ GA 1931*** | 0.12 | 220 | 1 | 2 | 1 | 1 | yes |
| Carboset XPD 2299/GA 1931 | 0.12 | 220 | 1 | 1 | 1 | 1 | yes |

NA — Not Available
*80/20 Blend
**40/60 Blend
***50/50 Blend
1 — Best
10 — Poor

EXAMPLES 13–18

These examples demonstrated that the solvent removability of the SMA® coated film and the pigment optical property and adhesion of both the SMA® and Carboset® coated film improved after the coatings underwent drawing and heat-setting in tenter ovens.

Example 13: A PET film was in-line coated with an aqueous solution of SMA® 1440H at 7.5% solids and the film was dried in an air oven heated to 105° C., sideways drawn at a ratio of 3.7:1 and heat set at 232° C. This yielded a 200 ga coated PET film with a dry coat thickness of 0.11 microns.

Example 14: A 200 ga PET (Melinex® 'S' film) was off-line coated with an aqueous solution of SMA® 1440H at 3% solids and dried in an air oven heated to 175° C. This film was not sideways drawn and heat set. The dry coat thickness was 0.09 microns.

Example 15: A PET film was in-line coated with an aqueous solution of Carboset® GA 1931 at 12% solids and the film was dried in an air oven heated to 105° C., sideways drawn at a ratio of 3.7:1, and heat set at 232° C. This yielded a 200 ga coated PET film with a dry coat thickness of 0.18 microns.

Example 16: A 200 ga PET (Melinex® 'S' film) was off-line coated with an aqueous solution of Carboset® GA 1931 at 3% solids and dried in an air oven heated to 175° C. This film was not sideways drawn and heat set. The dry coat thickness was 0.09 microns.

Example 17: A PET film was in-line coated with an aqueous solution of Neocryl® BT-24 from Zeneca Resins at 7.5% solids and the film was dried in an air oven heated to 105° C., sideways drawn at a ratio of 3.7:1, and heat set at 232° C. This yielded a 200 ga coated PET film with a dry coat thickness of 0.09 microns.

Example 18: A 200 ga PET (Melinex® 'S' film) was off-line coated with an aqueous solution of Neocryl® BT-24 at 3% solids and dried in an air oven heated to 175° C. This film was not sideways drawn and heat set. The dry coat thickness was 0.10 microns.

The films were tested (methods described above) and graded as follows (1—very good, 5—poor)

|  | Pigment Optical Property | Solvent Removability | Coating Adhesion | Acceptable |
|---|---|---|---|---|
| Example 13 | 1 | 1 | 1 | Yes |
| Example 14 | 4 | 2 | 3 | No |
| Example 15 | 1 | 2 | 1 | Yes |
| Example 16 | 3 | 2 | 4 | No |
| Example 17 | 5 | 3 | 1 | No |
| Example 18 | 5 | 3 | 1 | No |

While this invention has been described in terms of various preferred embodiments, one of skill in the art will readily appreciate that various modifications, substitutions and changes may be made without departing from the spirit thereof Accordingly, it is intended that the scope of the present invention be limited solely by the scope of the following claims, including equivalents thereof.

What is claimed is:

1. A release film which comprises a polymeric film coated on at least one surface thereof with a release layer, said release layer comprising a water soluble copolymer of styrene and an alpha, beta-unsaturated carboxylic acid or alpha, beta-unsaturated cyclic dicarboxylic acid anhydride, said copolymer having a weight average molecular weight of from about 700 to about 10,000.

2. The film of claim 1 wherein the polymeric film is selected from the group consisting of polyester, polypropylene, polyethylene, polybutene, olefin copolymer, polyamide, polycarbonate and polyacrylonitrile.

3. The film of claim 2 wherein the polymeric film is polyester.

4. The film of claim 3 wherein the polyester is polyethylene terephthalate (PET) or polyethylene naphthalate (PEN).

5. The film of claim 4 wherein the polyester is PET.

6. The film of claim 5 which further comprises a layer of metal deposited on the release layer.

7. The film of claim 6 wherein the metal is selected from the group consisting of aluminum, chromium, magnesium, copper, nickel, zinc, tin, silver, gold, titanium, silicon, and bismuth.

8. The film of claim 4 wherein the polyester is PEN.

9. The film of claim 1 wherein the release layer is a styrene/maleic anhydride copolymer.

10. The film of claim 9 wherein the molecular weight is from about 700 to about 2500.

11. The film of claim 9 wherein the copolymer is a blend of styrene/maleic anhydride copolymer and styrene/acrylic acid copolymer.

12. The film of claim 1 wherein the release layer is a styrene/acrylic acid copolymer.

13. The film of claim 1 wherein the release layer has a thickness ranging from about 0.01 to about 0.2 microns.

14. The film of claim 10 wherein the release layer has a thickness ranging from about 0.05 to about 0.18 microns.

15. The film of claim 14 wherein the release layer has a thickness of about 0.12 microns.

16. The film of claim 1 which further comprises a layer of metal deposited on the release layer.

17. The film of claim 16 wherein the metal is selected from the group consisting of aluminum, chromium, magnesium, copper, nickel, zinc, tin, silver, gold, titanium, silicon, and bismuth.

18. The film of claim 17 wherein the metal is aluminum.

19. A method of making a release film which comprises the steps of:

(a) coating the film on at least one surface thereof with an aqueous solution of a water soluble copolymer of styrene and an alpha, beta-unsaturated carboxylic acid or an aqueous solution of cyclic dicarboxylic acid anhydride, said copolymer having a weight average molecular weight of from about 700 to about 10,000;

(b) heating the coated film at a temperature sufficient for drying the composition to said film; and (c) heat setting the dried film.

20. The method of claim 19 wherein the film is a polyester.

21. The method of claim 19 wherein the copolymer is selected from the group consisting of a styrene/maleic anhydride.

22. The method of claim 19 wherein the dried film has a coating thickness ranging from about 0.01 to about 0.2 microns.

23. The method of claim 19 wherein the coated film is heat set at a temperature ranging from about 190° C. to about 240° C.

24. The method of claim 19 which further comprises depositing a layer of metal onto the coated film.

25. The method of claim 24 wherein the metal is selected from the group consisting of aluminum, chromium, magnesium, copper, nickel, zinc, tin, silver, gold, titanium, silicon, and bismuth.

26. The method of claim 25 wherein the metal is aluminum.

* * * * *